United States Patent [19]

Bell

[11] Patent Number: 5,230,260
[45] Date of Patent: Jul. 27, 1993

[54] TOOL FOR STRIPPING CABLE INSULATION AND METHOD

[76] Inventor: James R. Bell, 4326 Bayshore Dr., Little River, S.C. 29566

[21] Appl. No.: 941,806

[22] Filed: Sep. 8, 1992

[51] Int. Cl.$^5$ .............................................. H02G 1/12
[52] U.S. Cl. ...................................... 81/9.4; 29/403.3; 29/426.5
[58] Field of Search ................ 81/9.4, 9.51; 29/403.1, 29/403.3, 426.5, 426.1, 764

[56] References Cited

U.S. PATENT DOCUMENTS

| | | | |
|---|---|---|---|
| 4,281,444 | 8/1981 | Smith | 29/403.1 |
| 4,534,254 | 8/1985 | Budzich et al. | 29/403.3 |

FOREIGN PATENT DOCUMENTS

| | | | |
|---|---|---|---|
| 1158601 | 12/1963 | Fed. Rep. of Germany | 81/9.4 |
| 2158888 | 4/1973 | Fed. Rep. of Germany | 81/9.4 |

*Primary Examiner*—Roscoe V. Parker
*Attorney, Agent, or Firm*—Ralph Bailey

[57] ABSTRACT

A tool for stripping insulation from a cable has a wheel (D) with a circumferential groove accommodating the cable for guidance and movement of the wheel along the length of the cable. A wire from the cable is hooked to the wheel at one end in a fastener (E) defined by a receiving opening. A ratchet (F) effectuates indexing movement of the wheel along the cable for winding a wire from the cable while stripping the insulation as the wire is pulled from the cable as a result of such winding of the wire.

4 Claims, 1 Drawing Sheet

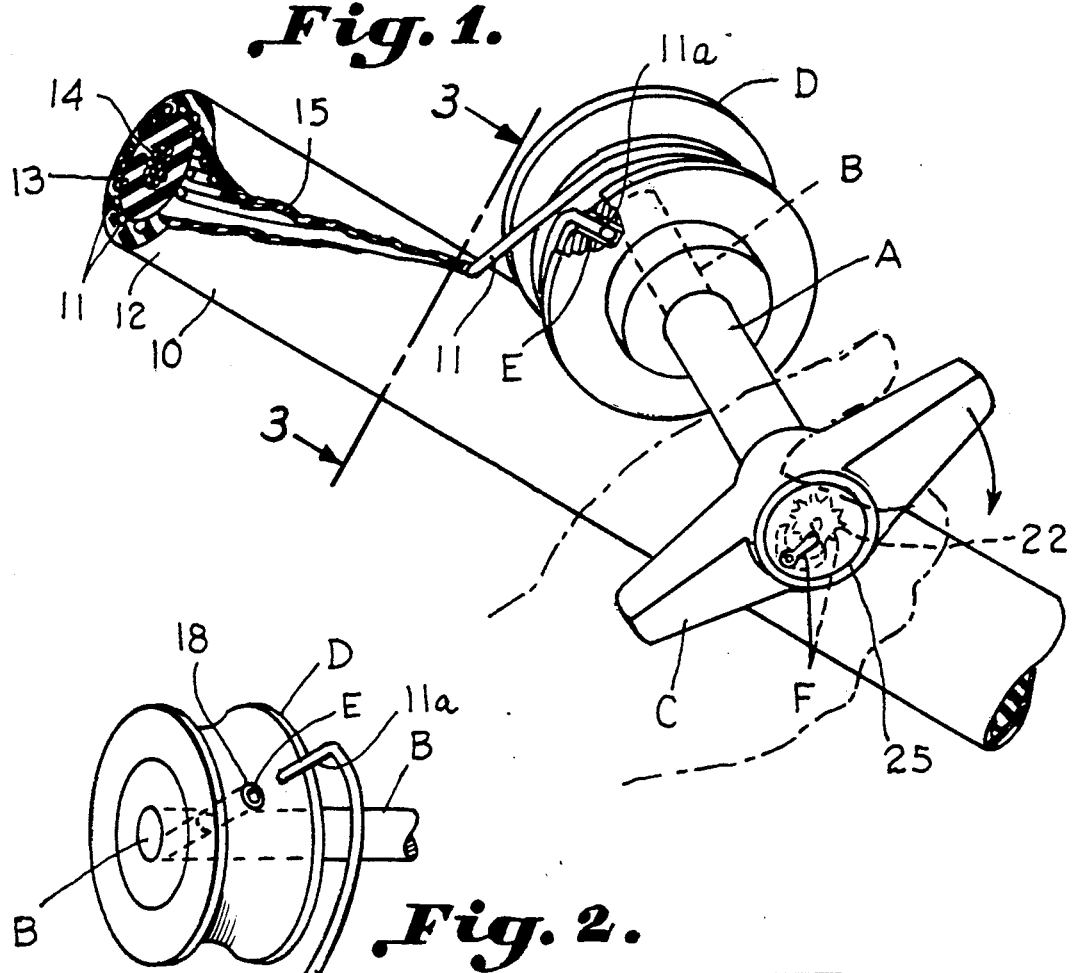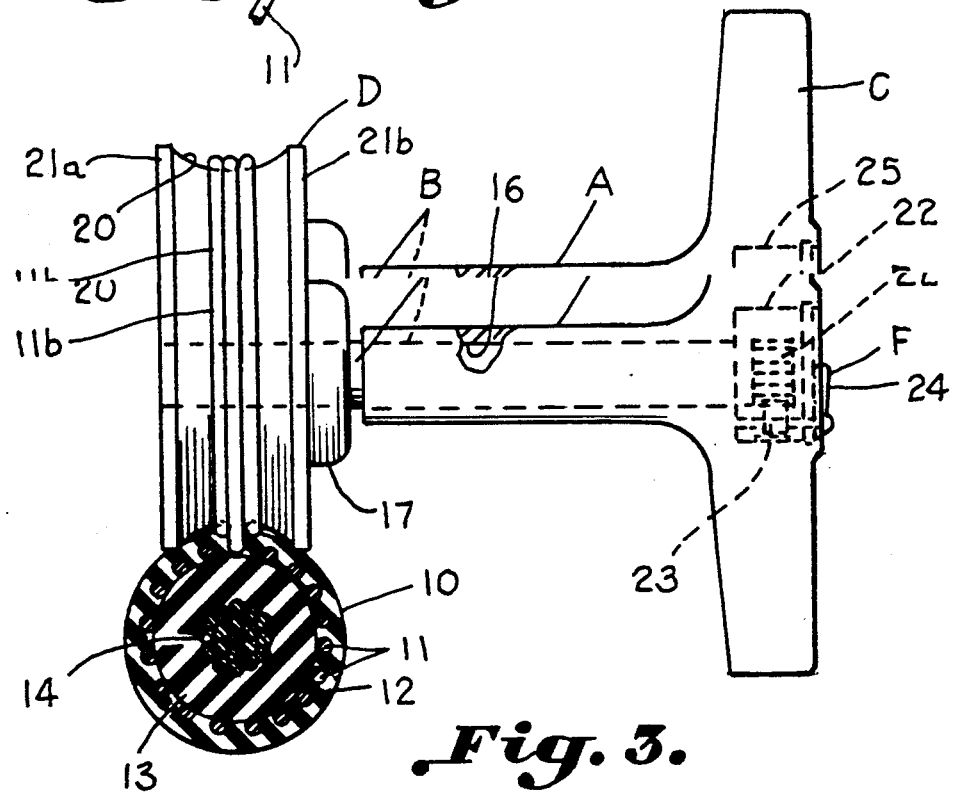

TOOL FOR STRIPPING CABLE INSULATION AND METHOD

BACKGROUND OF THE INVENTION

This invention relates to a tool for stripping insulation from a cable and to a method for winding wire from the cable during stripping and thereafter unwinding the wire.

Electrical power companies and others utilize underground coaxial cable which requires an insulation stripping operation whenever a termination of the cable is made. Such terminations are necessary as where a cable makes connection, for example, into a transformer or another cable. Where such an insulation stripping operation is called for, the pulling action which must be exerted against wires from the cable is awkward and must be accompanied by a forceful tearing away with stripping of the insulation from the cable. This is often accompanied by pulling with utility pliers for gripping the wires individually with a pulling action being exerted through pulling against the wire. Such an operation is tedious and time consuming requiring the exertion of considerable physical force by the operation.

Accordingly, it is an important object of this invention to provide a tool for augmenting the application of physical force to the orderly accomplishment of a stripping action tearing away the insulation from a cable and winding a wire against which force is exerted for causing the stripping of the insulation.

Another important object of the invention is the provision of a tool for reducing the time consumed for carrying out the cable stripping operation. The tool is utilized for stripping the cable and for winding and unwinding a wire during this procedure.

Another important object of this invention to provide a tool which is capable of winding a wire and simultaneously exerting a pulling force thereagainst while the tool follows the cable and the path of the wire during the stripping action resulting from a force exerted against the wire.

SUMMARY OF THE INVENTION

It has been found that a tool may be provided for exerting a pulling force against a wire during the operation of stripping a cable wherein the wire is wound within a circumferential groove carried by a wheel which exerts an indexing action during winding and which follows the helical path of the wire as it is stripped from the cable proceeding along the cable's length preparatory to free rotation of the wheel during unwinding of the wire wherein the wheel may also follow the course of the cable.

The method contemplates providing a wheel together with a ratcheting action for exerting incremental forces against a wire for simultaneously winding the wire while stripping the insulation from the cable and thereafter permitting free rotation of the wheel during unwinding while following the course of the cable.

BRIEF DESCRIPTION OF THE DRAWING

The construction designed to carry out the invention will be hereinafter described, together with other features thereof.

The invention will be more readily understood from a reading of the following specification and by reference to the accompanying drawing forming a part thereof, wherein an example of the invention is shown and wherein:

FIG. 1 is a perspective view illustrating a tool constructed in accordance with the present invention exerting a ratcheting action winding a wire being stripped from a cable;

FIG. 2 is a perspective view from the front further illustrating the wheel together with its mounting and having a fastener for attaching, a wire from the cable for stripping and winding upon the wheel of the tool; and FIG. 3 is a side elevation along the line 3—3 in FIG. 1 further illustrating the tool carrying out the stripping and winding action of the invention.

DESCRIPTION OF A PREFERRED EMBODIMENT

The drawings illustrate a tool for stripping insulation from a cable including a plurality of circumferentially spaced wires and having an insulating covering therefor. The tool includes a shank A. A stub shaft B is carried in axial alignment with the shank extending outwardly on one end of the shank. A handle C is carried transversely of the shank adjacent an end thereof opposite the stub shaft. A wheel D is carried by the shaft having a circumferential groove accommodating the cable therein for guidance and movement of the wheel along a length of the cable. A wire engaging fastener element E is carried on the wheel for fixing the wire thereon when beginning an insulation removal operation. A ratchet F is carried by the shank for effecting indexed movement of the wheel along the cable responsive to turning the handle to move the wheel along the cable.

FIGS. 1 and 3 illustrate a cable 10 of the type employed by the suppliers of electrical power and which is especially advantageous when used underground. The cable 10 includes a number of concentric circumferentially spaced wire conductor members 11. The conductor members 11 are covered by electrical insulation 12 and may be in part embedded in a central core 13 of insulation material which surround a bundle of centrally disposed conductor wires 14. As best illustrated in FIG. 1 the outside insulating member 12 is shown as being stripped away and is torn as at 15 in a spiral path which progressively moves about the length of the cable 10. A wire conductor 11 is illustrated as being hooked or bent downwardly as at 11a in FIG. 1 and thereby attached for winding upon the tool illustrated as being constructed in accordance with the invention.

The tool includes an elongated shank A which as is best illustrated in FIG. 3 as having an internal bore 16 for receiving one end of the stub shaft B which is carried in axial alignment with the shank. On the other end of the shank a handle C is carried integrally therewith. A hub member 17 receives the stub shaft for securement within the wheel D as by a pin 18 as is best illustrated in FIG. 2 attaching all these members on the free end of the shank opposite the handle. The end of the wire 11 as illustrated at 11a is received by a wire engaging fastener element E which includes bore 18 to provide a gripping element or receptacle for initial attachment of the wire 11 at the beginning of the stripping operation. The convolutions 11b of the wire are best illustrated in FIG. 3 as they are wound upon a circumferential groove 20 within the wheel D. The circumferential groove 20 is arcuate in cross section between flanges 21a and 21b carried at marginal portions thereof so as to provide a configuration generally conforming to the curved outer surface of the cable as the wire builds and as the tool progressively moves along the cable.

Indexing movements of the tool as the wheel moves along the cable are accomplished by intermittent turning and returning motions through limited arcs as by the handle are accomplished manually and are imparted through the ratchet F as the stripping operation progresses. The ratchet F includes a ratchet wheel 22 and a suitable pawl 23 which may be actuated in a conventional manner by actuation of the lever 24. The ratchet is of the customary reversing type which may apply indexing movement when the tool is moving along the cable to the right in FIG. 1 and which provides free wheeling when the convolutions of wire 11b are being unwound, when the wheel is being moved along the cable in a free wheeling action to the left in FIG. 1. The lever 24 may be moved so as to reverse the indexing and free wheeling motions above. The ratchet F is illustrated as being partially housed within a housing 25 provided in the handle for that purpose.

Accordingly, it is noted that considerable time and effort is conserved through operation of the tool constructed and described in the manner set forth above. Initially a length of wire 11 is pulled free as through the use of a pair of pliers and is bent so as to be hooked through the fastener element E as described initially in the stripping operation. The stripping continues as the wheel D is indexed along the cable thus producing mechanical advantage by the force exerted by the handle through the indexing motion. When the insulation has been stripped away, the wire may be unwound by free wheeling of the wheel in the opposite direction along the cable so as to complete the termination operation of the cable. This sequence may then be repeated as often as desirable to expose other conductors to carry out stripping.

While a preferred embodiment of the invention has been described using specific terms, such description is for illustrative purposes only, and it is to be understood that changes and variations may be made without departing from the spirit or scope of the following claims.

What is claimed is:

1. A tool for stripping insulation from a cable having a plurality of circumferentially spaced wires with insulation comprising:
   a shank;
   a stub shaft carried in axial alignment with said shank extending outwardly on one end of said shank;
   a handle carried transversely of said shank adjacent an end thereof opposite said stub shaft;
   wheel carried by said stub shaft having a circumferential groove accommodating said cable therein for guidance and movement of the wheel along a length of said cable;
   a wire engaging fastener element on said wheel for fixing the wire thereon when beginning an insulation removal; and
   a ratchet carried by said shank for effecting indexed movement of said wheel along said cable responsive to turning said handle to move the wheel along the cable.

2. The structure set forth in claim 1 wherein said ratchet permits free rolling movement of the wheel unwinding said wire when the direction of movement of the wheel is reversed.

3. A tool for stripping insulation from a cable having a plurality of circumferentially spaced wires with insulation comprising:
   a shank;
   a stub shaft carried in axial alignment with said shank extending outwardly on one end of said shank;
   a handle carried transversely of said shank adjacent an end thereof opposite said stub shaft;
   wheel carried by said stub shaft having a circumferential groove accommodating said cable therein for guidance and movement of the wheel along a length of said cable; and
   a wire engaging fastener element on said wheel for fixing the wire thereon when beginning an insulation removal;
   whereby said wheel may be moved along said cable responsive to turning said handle for stripping a wire from the insulation.

4. The method of stripping insulation from a cable having a plurality of circumferentially spaced wires with a covering of insulating material comprising the steps of:
   providing a stub shaft carried in axial alignment with a shank extending outwardly on one end of the shank;
   turning a handle carried transversely of said shank adjacent an end thereof opposite said stub shaft;
   rotating a wheel carried by said stub shaft having a circumferential groove accommodating said cable therein for guidance and movement of the wheel along a length of said cable;
   fastening a wire to an engaging element on said wheel for fixing the wire thereon when beginning an insulation removal operation;
   indexing said wheel along said cable responsive to turning said handle to activate a ratchet moving the wheel along the cable in one direction winding said wire on said wheel while stripping said insulating material; and
   freely rotating said wheel on said stub shaft unwinding said insulation by moving said wheel in an opposite direction.

* * * * *